US011043232B1

(12) United States Patent
Wu

(10) Patent No.: US 11,043,232 B1
(45) Date of Patent: Jun. 22, 2021

(54) SPIN TORQUE REVERSAL ASSISTED MAGNETIC RECORDING (STRAMR) DEVICE HAVING A WIDTH SUBSTANTIALLY EQUAL TO THAT OF A TRAILILNG SHIELD

(71) Applicant: Headway Technologies, Inc., Milpitas, CA (US)

(72) Inventor: Yan Wu, Cupertino, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 16/781,618

(22) Filed: Feb. 4, 2020

(51) Int. Cl.
| G11B 5/31 | (2006.01) |
| G11B 5/11 | (2006.01) |
| G11B 13/04 | (2006.01) |
| G11B 5/127 | (2006.01) |
| G11B 5/187 | (2006.01) |

(Continued)

(52) U.S. Cl.
CPC .............. *G11B 5/11* (2013.01); *G11B 5/1278* (2013.01); *G11B 5/187* (2013.01); *G11B 5/315* (2013.01); *G11B 5/3143* (2013.01); *G11B 5/3146* (2013.01); *G11B 5/3153* (2013.01); *G11B 5/3163* (2013.01); *G11B 13/04* (2013.01);

(Continued)

(58) Field of Classification Search
CPC ......... G11B 5/1278; G11B 5/187; G11B 5/23; G11B 5/3143; G11B 5/3146; G11B 5/315; G11B 5/3153; G11B 5/3163
See application file for complete search history.

(56) References Cited

U.S. PATENT DOCUMENTS

| 6,785,092 B2 | 8/2004 | Covington et al. |
| 6,809,899 B1 | 10/2004 | Chen et al. |

(Continued)

FOREIGN PATENT DOCUMENTS

| JP | 2002-133610 | 5/2002 |
| JP | 2002-298309 | 10/2002 |

(Continued)

OTHER PUBLICATIONS

PTO Office Action, U.S. Appl. No. 12/964,202, Applicant: Sasaki et al., Notification dated Nov. 28, 2012, 11 pages.

(Continued)

*Primary Examiner* — Jefferson A Evans
(74) *Attorney, Agent, or Firm* — Saile Ackerman LLC; Stephen B. Ackerman

(57) ABSTRACT

A spin transfer torque reversal assisted magnetic recording (STRAMR) device is disclosed wherein a flux change layer (FCL) is formed between a main pole (MP) trailing side and a trailing shield (TS). The FCL has a magnetization that flips to a direction substantially opposing the write gap magnetic field when a direct current (DC) of sufficient current density is applied across the STRAMR device thereby increasing reluctance in the WG and producing a larger write field output at the air bearing surface. Heat transfer in the STRAMR device is enhanced and production cost is reduced by enlarging the STRAMR width to be essentially equal to that of the TS, and where the TS and STRAMR widths are formed using the same process steps. Bias voltage is used to control the extent of FCL flipping to a center portion to optimize the gain in area density capability in the recording system.

29 Claims, 9 Drawing Sheets

(51) Int. Cl.
  *G11B 5/00* (2006.01)
  *G11B 5/23* (2006.01)
(52) U.S. Cl.
  CPC .............. *G11B 5/23* (2013.01); *G11B 5/3136* (2013.01); *G11B 2005/0024* (2013.01)

(56) References Cited

U.S. PATENT DOCUMENTS

| | | |
|---|---|---|
| 6,954,340 B2 | 10/2005 | Shukh et al. |
| 7,009,812 B2 | 3/2006 | Hsu et al. |
| 7,589,600 B2 | 9/2009 | Dimitrov et al. |
| 7,724,469 B2 | 5/2010 | Gao et al. |
| 7,835,111 B2 | 11/2010 | Flint et al. |
| 7,957,098 B2 | 6/2011 | Yamada et al. |
| 7,963,024 B2 | 6/2011 | Neuhaus |
| 7,978,442 B2 | 7/2011 | Zhang et al. |
| 7,982,996 B2 | 7/2011 | Smith et al. |
| 8,027,110 B1 | 9/2011 | Yamanaka et al. |
| 8,064,244 B2 | 11/2011 | Zhang et al. |
| 8,068,312 B2 | 11/2011 | Jiang et al. |
| 8,154,825 B2 | 4/2012 | Takashita et al. |
| 8,203,389 B1 | 6/2012 | Zhou et al. |
| 8,264,792 B2 | 9/2012 | Bai et al. |
| 8,270,112 B2 | 9/2012 | Funayama et al. |
| 8,295,008 B1 | 10/2012 | Sasaki et al. |
| 8,310,787 B1 | 11/2012 | Sasaki et al. |
| 8,320,079 B2 | 11/2012 | Iwasaki et al. |
| 8,427,781 B1 | 4/2013 | Sasaki et al. |
| 8,446,690 B2 | 5/2013 | Alex et al. |
| 8,462,461 B2 | 6/2013 | Braganca et al. |
| 8,477,452 B2 | 7/2013 | Sasaki et al. |
| 8,493,687 B2 | 7/2013 | Sasaki et al. |
| 8,582,240 B1 | 11/2013 | Chen et al. |
| 8,582,241 B1 | 11/2013 | Yu et al. |
| 8,604,886 B2 | 12/2013 | Nikonov et al. |
| 8,634,163 B2 | 1/2014 | Tanabe et al. |
| 8,749,919 B2 | 6/2014 | Sasaki et al. |
| 8,767,347 B1 | 7/2014 | Sasaki et al. |
| 8,792,210 B2 | 7/2014 | de la Fuente et al. |
| 9,142,228 B2 | 9/2015 | Fujita et al. |
| 9,230,571 B1 | 1/2016 | Chen et al. |
| 9,275,672 B2 | 3/2016 | Shiroishi et al. |
| 9,299,367 B1 | 3/2016 | Tang et al. |
| 9,361,912 B1 | 6/2016 | Liu et al. |
| 9,406,317 B1 | 8/2016 | Tang et al. |
| 9,466,319 B1 | 10/2016 | Tang et al. |
| 9,805,746 B1 | 10/2017 | Okamura |
| 9,824,701 B2 | 11/2017 | Tang et al. |
| 9,934,797 B2 | 4/2018 | Takahashi et al. |
| 9,966,091 B2 | 5/2018 | Chen et al. |
| 9,978,404 B2 | 5/2018 | Taguchi et al. |
| 10,032,469 B2 | 7/2018 | Lim et al. |
| 10,032,470 B1 | 7/2018 | Degawa et al. |
| 10,037,772 B2 | 7/2018 | Okamura et al. |
| 10,090,007 B2 | 10/2018 | Zhu |
| 10,121,497 B1 | 11/2018 | Takahashi et al. |
| 10,210,888 B1* | 2/2019 | Li .................. H01L 43/04 |
| 10,325,618 B1 | 6/2019 | Wu et al. |
| 10,354,708 B2 | 7/2019 | Ohmori et al. |
| 10,366,714 B1 | 7/2019 | Olson |
| 10,410,658 B1 | 9/2019 | Liu et al. |
| 10,490,216 B1 | 11/2019 | Chen et al. |
| 10,522,174 B1 | 12/2019 | Chen |
| 10,546,600 B1* | 1/2020 | Koizumi ............. G11B 5/6082 |
| 10,559,318 B1* | 2/2020 | Chen .................. G11B 5/3116 |
| 10,580,441 B1* | 3/2020 | Chen .................. G11B 5/4826 |
| 10,699,731 B1* | 6/2020 | Wu .................... G11B 5/4826 |
| 10,762,917 B1* | 9/2020 | Le ..................... G11B 5/115 |
| 2002/0034043 A1 | 3/2002 | Okada et al. |
| 2004/0150910 A1 | 8/2004 | Okada et al. |
| 2005/0128637 A1 | 6/2005 | Johnston et al. |
| 2005/0141137 A1 | 6/2005 | Okada et al. |
| 2006/0044682 A1 | 3/2006 | Le et al. |
| 2006/0087765 A1 | 4/2006 | Iwakura et al. |
| 2006/0103978 A1 | 5/2006 | Takano et al. |
| 2007/0177301 A1 | 8/2007 | Han et al. |
| 2008/0013209 A1 | 1/2008 | Sasaki et al. |
| 2008/0088972 A1 | 4/2008 | Sasaki et al. |
| 2009/0059426 A1 | 3/2009 | Sasaki et al. |
| 2009/0080106 A1 | 3/2009 | Shimizu et al. |
| 2009/0128953 A1 | 5/2009 | Jiang et al. |
| 2009/0296275 A1 | 12/2009 | Sasaki et al. |
| 2010/0165517 A1 | 7/2010 | Araki et al. |
| 2011/0211271 A1 | 9/2011 | Ng et al. |
| 2012/0262821 A1 | 10/2012 | Taguchi |
| 2012/0292723 A1 | 11/2012 | Luo et al. |
| 2013/0062308 A1 | 3/2013 | Funayama et al. |
| 2013/0215532 A1 | 8/2013 | Taguchi |
| 2014/0071562 A1 | 3/2014 | Chen et al. |
| 2014/0177092 A1 | 6/2014 | Katada et al. |
| 2014/0313616 A1* | 10/2014 | Kusukawa ........... G11B 5/3163 360/125.03 |
| 2015/0043106 A1* | 2/2015 | Yamada ............... G11B 5/1278 360/123.05 |
| 2015/0098150 A1* | 4/2015 | Chiu .................... G11B 5/3146 360/125.03 |
| 2016/0035375 A1 | 2/2016 | Gao |
| 2016/0218728 A1* | 7/2016 | Zhu ....................... G11B 5/235 |
| 2017/0133044 A1 | 5/2017 | Lim et al. |
| 2018/0075868 A1 | 3/2018 | Koui et al. |
| 2019/0088275 A1* | 3/2019 | Narita ................... G11B 5/3116 |
| 2019/0244635 A1 | 8/2019 | Goncharov |
| 2019/0279666 A1* | 9/2019 | Freitag ................ G11B 5/3909 |
| 2020/0152228 A1* | 5/2020 | Tang ..................... G11B 5/147 |
| 2020/0176022 A1* | 6/2020 | Li ........................... G11B 5/11 |
| 2020/0312354 A1* | 10/2020 | Wu ...................... G11B 5/3143 |
| 2020/0381012 A1 | 12/2020 | Chembrolu |

FOREIGN PATENT DOCUMENTS

| | | |
|---|---|---|
| JP | 2008-021398 | 1/2008 |
| JP | 2010-157303 | 7/2010 |

OTHER PUBLICATIONS

"The Feasibility of Magnetic Recording at 10 Terabits Per Square Inch on Conventional Media," by Roger Wood et al., IEEE Transactions on Magnetics, vol. 45, No. 2, Feb. 2009, pp. 917-923.

Microwave Assisted Magnetic Recording, by Jian-Gang Zhu et al., IEEE Transactions on Magnetics, vol. 44, No. 1, Jan. 1, 2008, pp. 125-131.

Nov. 13, 2012, Office Action issued in Japanese Patent Application No. 2011-149242, with English language translation, 4 pages.

Nov. 13, 2012, Office Action issued in Japanese Patent Application No. 2011-149243, with English language translation, 6 pages.

Nov. 13, 2012, Office Action issued in Japanese Patent Application No. 2011-149244, with English language translation, 6 pages.

"Spin-Torque Oscillator Based on Magnetic Tunnel Junction with a Perpendicularly Magnetized Free Layer and In-Plane Magnetized Polarizer," by Hitoshi Kubota, et al., 2013 The Japan Society of Applied Physics, Applied Physics Express 6 (2013) 103003, Sep. 27, 2013, pp. 1-3.

"High-Power Coherent Microwave Emission from Magnetic Tunnel Junction Nano-oscillators with Perpendicular Anisotropy," by Zhongming Zeng, et al, 2012 American Chemical Society, Jun. 4, 2012, vol. 6, No. 7, pp. 6115-6121.

Co-pending U.S. Appl. No. 16/781,631, filed Feb. 4, 2020, by Yan Wu et al., "Dual Flux Change Layer (FCL) Assisted Magnetic Recording," 36 pages.

Co-pending U.S. Appl. No. 16/546,387, filed Aug. 21, 2019, by Yan Wu, "Spin Transfer Torque Oscillator (STO) With Spin Torque Injection to a Flux Generating Layer (FGL) From Two Sides," 31 pages.

U.S. Office Action, U.S. Appl. No. 16/781,631, Applicant: Wu et al., dated Jun. 25, 2020, 14 pages.

U.S. Notice of Allowance, U.S. Appl. No. 16/781,631, First Named Inventor: Yan Wu, dated Nov. 23, 2020, 16 pages.

(56) References Cited

OTHER PUBLICATIONS

U.S. Notice of Allowance, U.S. Appl. No. 16/781,631, Applicant: Wu et al., dated Feb. 17, 2021, 11 pages.

* cited by examiner

1

SPIN TORQUE REVERSAL ASSISTED MAGNETIC RECORDING (STRAMR) DEVICE HAVING A WIDTH SUBSTANTIALLY EQUAL TO THAT OF A TRAILILNG SHIELD

RELATED PATENT APPLICATIONS

This application is related to the following: U.S. Pat. Nos. 10,325,618; 10,490,216; Ser. No. 16/546,387, filed on Aug. 21, 2019; and Ser. No. 16/781,631, filed on Feb. 4, 1920; assigned to a common assignee, and herein incorporated by reference in their entirety.

TECHNICAL FIELD

The present disclosure relates to a design for a spin torque oscillation (STO) device that enables an improved scheme for spin transfer torque reversal assisted magnetic recording (STRAMR) wherein a flux change layer (FCL) formed in a write gap (WG) between a main pole (MP) trailing side and a trailing shield (TS) has a magnetization that flips to a direction substantially opposite to the magnetic field in the WG as a result of spin torque generated by spin polarized electrons from an adjacent magnetic layer when a current (Ia) is applied between the MP and TS, and across the STO device thereby enhancing the MP write field, and where the STO device has a width substantially greater than the side gap width to transmit heat generated by Ia away from the STO, reducing the local temperature and improving device reliability.

BACKGROUND

As the data areal density in hard disk drive (HDD) increases, critical dimensions in write heads and media bits are both required to be made in smaller sizes. However, as the critical dimensions of a write head shrinks, its writability degrades. To improve writability, new technology is being developed that assists writing to a media bit. Two main approaches currently being investigated are thermally assisted magnetic recording (TAMR) and microwave assisted magnetic recording (MAMR). The latter is described by J-G. Zhu et al. in "Microwave Assisted Magnetic Recording", IEEE Trans. Magn., vol. 44, pp. 125-131 (2008). MAMR uses a spin torque device to generate a high frequency field that reduces the coercive field of a medium bit thereby allowing the bit to be switched with a lower main pole field.

Spin transfer torque devices are based on a spin-transfer effect that arises from the spin dependent electron transport properties of ferromagnetic (FM)-spacer-FM multilayers. When a spin-polarized current passes through a magnetic multilayer in a CPP (current perpendicular to plane) configuration, the spin angular moment of electrons from a first FM layer (FM1) that are incident on a second FM layer (FM2) interacts with magnetic moments of FM2 near the interface between the FM2 and non-magnetic spacer. Through this interaction, the electrons transfer a portion of their angular momentum to FM2. As a result, spin-polarized current can switch the FM2 magnetization direction if the current density is sufficiently high. A STO device is also referred to as a spintronic device and has FM layers that may have a perpendicular magnetic anisotropy (PMA) component where magnetization is aligned substantially perpendicular to the plane FM1 and FM2 in the absence of external magnetic field and without electrical current being applied.

However, unlike Magnetoresistive Random Access Memory (MRAM) where PMA is necessary to keep magnetization perpendicular to the plane in a free layer and reference layer, for example, STO in MAMR and related applications has a sufficiently strong WG field to align magnetization in FM layers without requiring inherent PMA in the FM layers.

MAMR typically operates with the application of a bias current across the STO device and between TS and MP in order to apply spin torque on an oscillation layer (OL) so that the OL's oscillation of magnetic moment generates a high radio frequency (RF) field. The RF field induces a precessional state and lowers the coercivity in a magnetic bit to be written in a magnetic medium. Simultaneously, a write field from the MP is applied from an air bearing surface (ABS) to the magnetic medium, and lower field strength is needed to write the bit because of the RF field assist. In a STRAMR design, FCL magnetization flips to an opposite direction when the applied current is sufficiently large thereby increasing the WG reluctance, which causes a greater write field output. Both MAMR and STRAMR typically require a relatively high current density ($>10^8$ A/cm$^2$) in order to apply a useful spin torque effect for generating a RF field, or for FCL flipping in the latter case. Since existing STRAMR designs typically have a cross-track width proximate to the track width of the MP trailing side as well as a stripe height from the ABS with a dimension similar to the track width, the current required for FCL flipping is confined to a small STO volume and tends to generate a substantial amount of heat that limits device reliability. Accordingly, there is a need to provide an improved STRAMR device that operates at reduced temperature even with an Ia current density required for FCL flipping. Furthermore, fewer fabrication steps are desirable in order to reduce STRAMR production cost that is currently related to defining small dimensions in each of the height, thickness, and width directions.

SUMMARY

One objective of the present disclosure is to provide a STRAMR device that operates at a reduced temperature compared with existing designs where an Ia current density is required to flip an FCL magnetization to enhance the write field.

A second objective of the present disclosure is to provide a STRAMR device according to the first objective, and that requires fewer fabrication steps so that productivity is enhanced.

A third objective of the present disclosure is to provide a method of forming the STRAMR device according to the first and second objectives.

According to the embodiments of the present invention, these objectives are achieved with a PMR writer having a STRAMR design wherein a STRAMR device is formed between a main pole and a trailing shield, and within a WG. Leads from the MP and TS are connected to a direct current (DC) source that provides an applied current (Ia) across the STRAMR device during a write process.

According to a first embodiment, the STRAMR device has a stack of layers with a non-spin polarization preserving layer (pxL), FCL, spin polarization preserving layer (ppL), and an optional reference layer (RL) sequentially formed on a main pole (MP) tapered trailing side at the ABS. Spin polarized electrons transiting in pxL will have their polarization diminished by spin flipping scattering. On the other hand, spin polarized electrons will largely retain their polarization when traversing through the ppL. The flux change layer (FCL) has a magnetization that is capable of being flipped if there is sufficient polarized electron current density in the FCL. RL has a magnetization that is substantially aligned with the WG field direction. The RL is considered sacrificial since the layer may be partially or entirely removed during a planarization process that forms a STRAMR top surface, or may be replaced with a bottom portion of the TS. A key feature is that the STRAMR device cross-track width is substantially larger than the sum of the track width and the width of the side gaps. As a result, the heat within the STRAMR device will be transferred in additional directions to the two sides of the side shields. Heat is also dispersed to the main pole and WS as in conventional designs. This will lower the operating temperature of the element and improves reliability compared with a design where FCL width is proximate to the track width. Preferably, the STRAMR device width is defined during the same process steps that determine the TS width thereby simplifying the fabrication process.

In the first embodiment, current (Ia) is applied from the TS to the MP (electrons proceed from the MP to TS). The FCL has a magnetization that is oriented in the WG field ($H_{WS}$) direction in the absence of an applied current, but flips to a direction substantially opposite to $H_{WS}$ when Ia current density is sufficiently large. Spin polarized electrons from the RL (or the TS when the RL is absent) apply spin torque to the FCL via reflected spin polarized electrons from the RL traversing to the FCL to cause the magnetization reversal. Accordingly, there is greater magnetic reluctance in the WG, which forces more magnetic flux out of WG region and enhances the field generated by the MP into a magnetic medium.

In a second embodiment, the STRAMR stack of layers of the first embodiment is retained except the positions of layers are reversed so that the optional RL, ppL, FCL, and pxL are sequentially formed on the MP trailing side. The RL may be merged into the MP trailing side so that a portion of the MP proximate to the MP/ppL2 interface serves to receive spin polarize electrons that flow from the FCL to the MP when Ia is applied from the MP to TS. Here, reflected spin polarized electrons from the RL (or the MP) apply spin torque to the FCL to cause FCL magnetization to flip to an opposite direction substantially opposed to the WG field. The second embodiment has the same benefits described previously of enhancing the write field (FCL flipping) but at a lower temperature than in the prior art, and where fewer process steps are needed to form the STRAMR device because device width is determined during the same process flow that is used to define the TS width.

In all embodiments, the RL (when present) is comprised of a magnetic material with a sufficient saturation magnetization (Ms) value and with high spin polarization level at the Fermi level to not cause an adverse effect in the WG field and to enable a smaller critical current density. The FCL preferably has a Ms designed so that it can be flipped with a certain critical current density, and may have a low damping constant $\alpha$ that is preferably <0.02 so that FCL magnetization is flipped with a bias current that is less than $1\times10^8$ Amps/cm². Consequently, there is minimal risk of electromigration within the STRAMR layers, and acceptable device reliability is realized.

The present disclosure also encompasses a process flow for forming a STRAMR device between a MP and TS according to an embodiment described herein. In one preferred embodiment, a STRAMR stack of layers is deposited on the MP trailing side, side gaps, and side shields. Then, a backside is formed on the STRAMR layers, and a dielectric layer is deposited behind the STRAMR backside as a refill. After a trailing shield (TS) is deposited on the STRAMR stack of layers, a photoresist layer is coated and patterned to form a photoresist mask with sides on each side of a center plane that bisects the MP trailing side. An ion beam etch step is employed to remove unprotected portions of the TS and STRAMR stack, and stops on a top surface of the side shields (SS) thereby forming sides on the STRAMR device that are self-aligned to the TS sides. Thereafter, the photoresist mask is removed and the write shield (WS) is plated on the TS and SS top surfaces and contacts the STRAMR device and TS sides.

A high resistivity material may be used in the side gap to minimize electrical conductance from the SS and WS to the MP sides to divert more electrical current to the trailing shield side. Magnetic moment flipping within a center portion of the FCL above the MP trailing side may be realized by means of tuning the bias current when a current is applied between the MP and TS.

DETAILED DESCRIPTION

Figure 1:
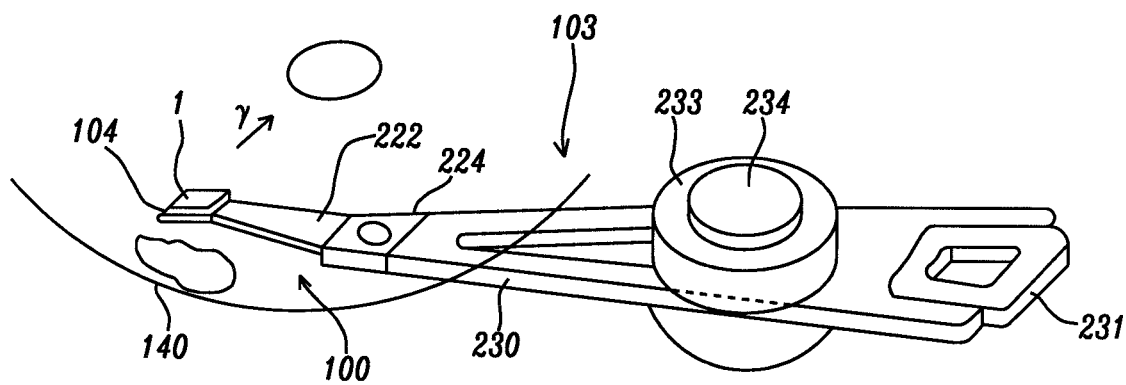
FIG. 1 is a perspective view of a head arm assembly of the present disclosure.

The present disclosure is a perpendicular magnetic recording (PMR) writer having a STRAMR structure wherein a STRAMR device that is configured to enable FCL flipping, and thereby enhance the write field on a magnetic medium, is formed between a MP and TS, and a process for making the same. In the drawings, the y-axis is in a cross-track direction, the z-axis is in a down-track direction, and the x-axis is in a direction orthogonal to the ABS and towards a back end of the writer structure. Thickness refers to a down-track distance, width is a cross-track distance, and height is a distance from the ABS in the x-axis direction. In some drawings, a magnetic bit is considerably enlarged over actual size in order to more easily depict a magnetization therein. FCL magnetization flipping occurs at a first Ia current density, but the FCL also enters a precessional state within a certain range of Ia current density (less than the first Ia current density) to provide a MAMR effect.

Referring to FIG. 1, a head gimbal assembly (HGA) 100 includes a magnetic recording head 1 comprised of a slider and a PMR writer structure formed thereon, and a suspension 103 that elastically supports the magnetic recording head. The suspension has a plate spring-like load beam 222 formed with stainless steel, a flexure 104 provided at one end portion of the load beam, and a base plate 224 provided at the other end portion of the load beam. The slider portion of the magnetic recording head is joined to the flexure, which gives an appropriate degree of freedom to the magnetic recording head. A gimbal part (not shown) for maintaining a posture of the magnetic recording head at a steady level is provided in a portion of the flexure to which the slider is mounted.

HGA 100 is mounted on an arm 230 formed in the head arm assembly 103. The arm moves the magnetic recording head 1 in the cross-track direction y of the magnetic recording medium 140. One end of the arm is mounted on base plate 224. A coil 231 that is a portion of a voice coil motor is mounted on the other end of the arm. A bearing part 233 is provided in the intermediate portion of arm 230. The arm is rotatably supported using a shaft 234 mounted to the bearing part 233. The arm 230 and the voice coil motor that drives the arm configure an actuator.

Figure 2:
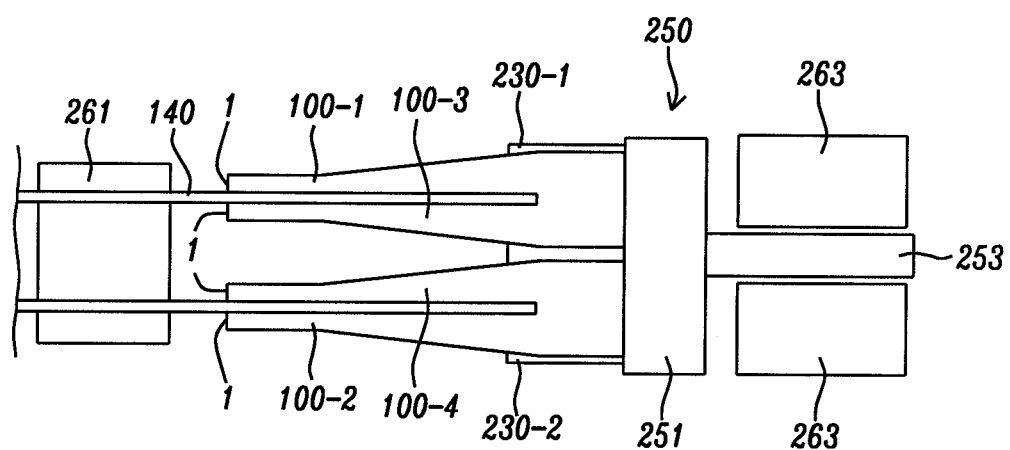
FIG. 2 is side view of a head stack assembly of the present disclosure.

Next, a side view of a head stack assembly (FIG. 2) and a plan view of a magnetic recording apparatus (FIG. 3) wherein the magnetic recording head 1 is incorporated are depicted. The head stack assembly 250 is a member to which a plurality of HGAs (HGA 100-1 and HGA 100-2 are at outer positions while HGA 100-3 and HGA 100-4 are at inner positions in the illustration) is mounted to arms 230-1, 230-2, respectively, on carriage 251. A HGA is mounted on each arm at intervals so as to be aligned in the perpendicular direction (orthogonal to magnetic medium 140). The coil portion (231 in FIG. 1) of the voice coil motor is mounted at the opposite side of each arm in carriage 251. The voice coil motor has a permanent magnet 263 arranged at an opposite position across the coil 231.

Figure 3:
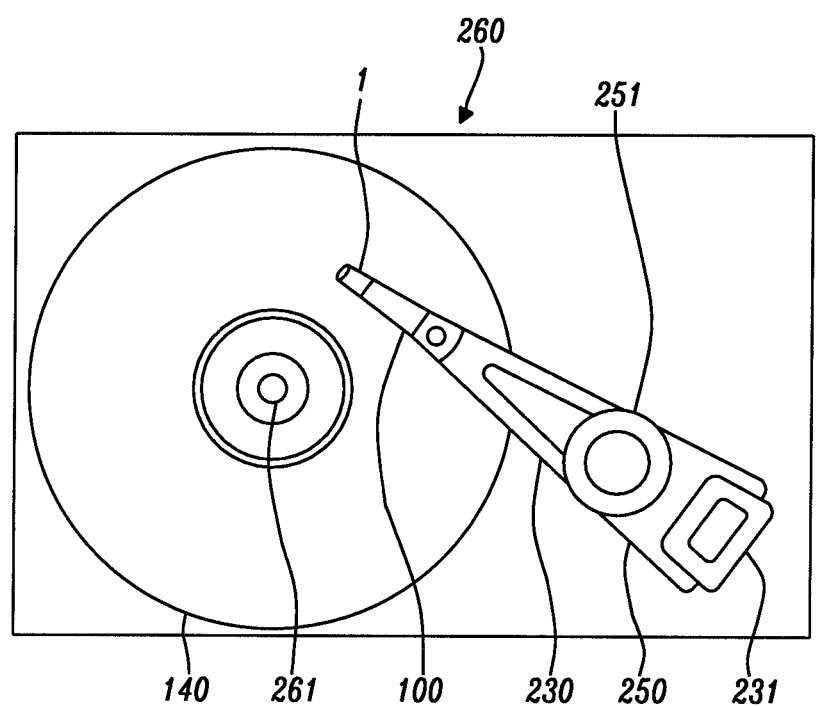
FIG. 3 is a plan view of a magnetic recording apparatus of the present disclosure.

With reference to FIG. 3, the head stack assembly 250 is incorporated in a magnetic recording apparatus 260. The magnetic recording apparatus has a plurality of magnetic media 140 mounted to a spindle motor 261. For every magnetic recording disk, there are two magnetic recording heads arranged opposite one another across the magnetic recording disk. The head stack assembly and actuator except for the magnetic recording heads 1 correspond to a positioning device, and support the magnetic recording heads, and position the magnetic recording heads relative to the magnetic recording medium. The magnetic recording heads are moved in a cross-track direction on the magnetic recording disk by the actuator. The magnetic recording head records information into the magnetic recording media with a PMR writer element (not shown) and reproduces the information recorded in the magnetic recording media by a magnetoresistive (MR) sensor element (not shown).

Figure 4:
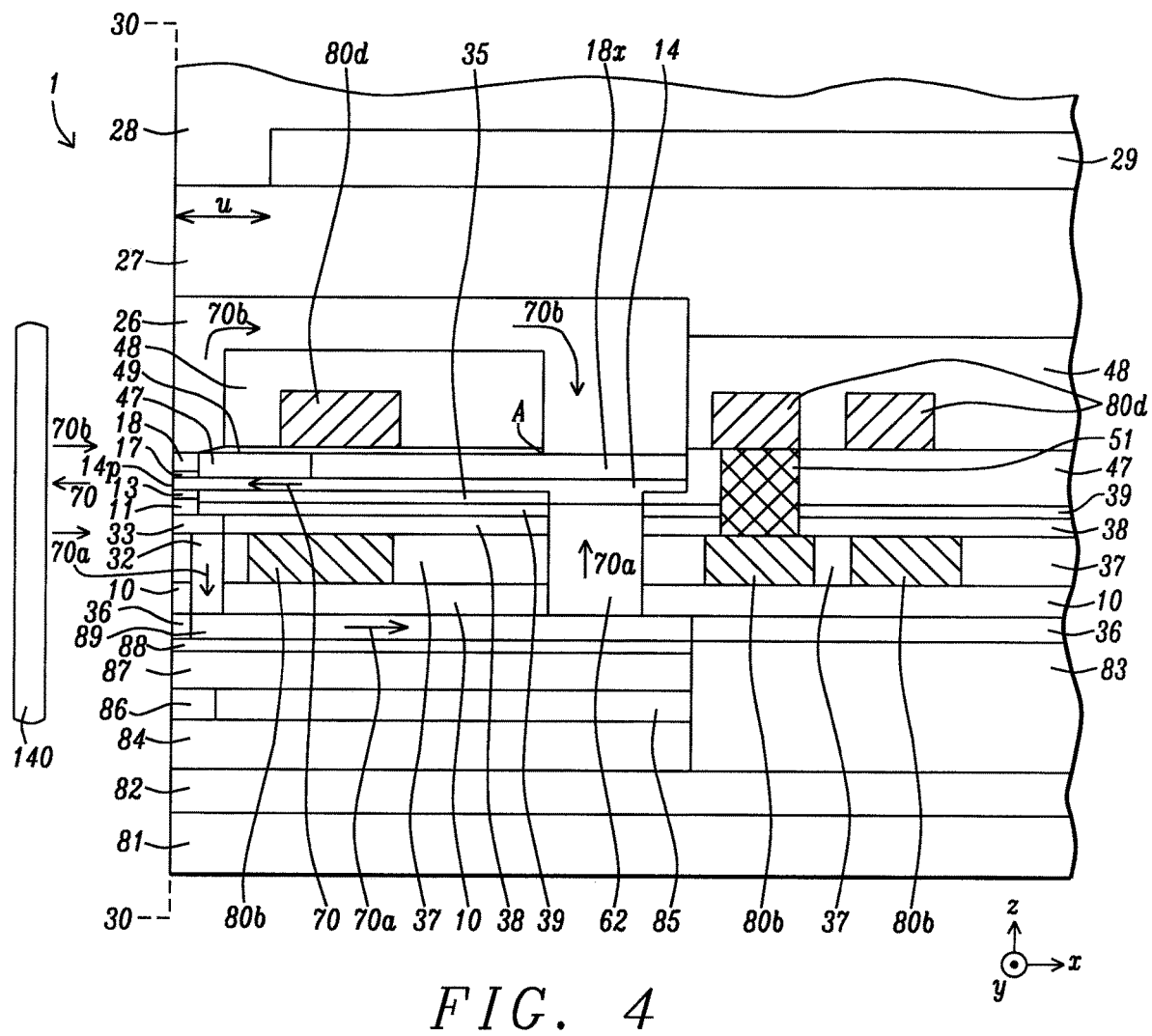
FIG. 4 is a down-track cross-sectional view of a combined read-write head with leading and trailing loop pathways for magnetic flux return to the main pole according to an embodiment of the present disclosure.

Referring to FIG. 4, magnetic recording head 1 comprises a combined read-write head. The down-track cross-sectional view is taken along a center plane (44-44 in FIG. 16A) formed orthogonal to the ABS 30-30, and that bisects the main pole layer 14. The read head is formed on a substrate 81 that may be comprised of AlTiC (alumina+TiC) with an overlying insulation layer 82 that is made of a dielectric material such as alumina. The substrate is typically part of a slider formed in an array of sliders on a wafer. After the combined read head/write head is fabricated, the wafer is sliced to form rows of sliders. Each row is typically lapped to afford an ABS before dicing to fabricate individual sliders that are used in a magnetic recording device. A bottom shield 84 is formed on insulation layer 82.

A magnetoresistive (MR) element also known as MR sensor 86 is formed on bottom shield 84 at the ABS 30-30 and typically includes a plurality of layers (not shown) including a tunnel barrier formed between a pinned layer and a free layer where the free layer has a magnetization (not shown) that rotates in the presence of an applied magnetic field to a position that is parallel or antiparallel to the pinned layer magnetization. Insulation layer 85 adjoins the backside of the MR sensor, and insulation layer 83 contacts the backsides of the bottom shield and top shield 87. The top shield is formed on the MR sensor. An insulation layer 88 and a second top shield (S2B) layer 89 are sequentially formed on the top magnetic shield. Note that the S2B layer 89 may serve as a flux return path (RTP) in the write head portion of the combined read/write head. Thus, the portion of the combined read/write head structure formed below layer 89 in FIG. 4 is typically considered as the read head. In other embodiments (not shown), the read head may have a dual reader design with two MR sensors, or a multiple reader design with multiple MR sensors.

The present disclosure anticipates that various configurations of a write head may be employed with the read head portion. In the exemplary embodiment, magnetic flux 70 in main pole (MP) layer 14 is generated with flowing a current through bucking coil 80b and driving coil 80d that are below and above the main pole layer, respectively, and are connected by interconnect 51. Magnetic flux 70 exits the main pole layer at pole tip 14p at the ABS 30-30 and is used to write a plurality of bits on magnetic media 140. Magnetic flux 70b returns to the main pole through a trailing loop comprised of trailing shields 17, 18, an uppermost (PP3) trailing shield 26, and top yoke 18x. There is also a leading return loop for magnetic flux 70a that includes leading shield (LS) 11, leading shield connector (LSC) 33, S2 connector (S2C) 32, return path 89, and back gap connection (BGC) 62. In another embodiment (not shown), only the LS is retained in the leading return loop in a so-called non-dual write shield (nDWS) scheme where the LSC, S2C, return path, and BGC are omitted to enhance magnetic flux in the trailing loop. The magnetic core may also comprise a bottom yoke 35 below the main pole layer. Dielectric layers 10, 13, 36-39, and 47-49 are employed as insulation layers around magnetic and electrical components. A protection layer 27 covers the PP3 trailing shield and is made of an insulating material such as alumina. Above the protection layer and recessed a certain distance u from the ABS 30-30 is an optional cover layer 29 that is preferably comprised of a low coefficient of thermal expansion (CTE) material such as SiC. Overcoat layer 28 is formed as the uppermost layer in the write head.

Previously, in related U.S. Pat. No. 10,325,618, we disclosed a STRAMR device between the MP and TS, and wherein a single FCL has a magnetization that flips to an opposite direction when a current (Ia) of sufficient current density is applied from the TS to MP. In related U.S. Pat. No. 10,490,216, a spin polarization (SP) layer is formed on both sides of a FCL so that Ia may be applied from the MP to TS, or in the reverse direction.

However, in both of the aforementioned STRAMR examples, Ia current density required for magnetization flipping is typically sufficiently large so that there is a significant risk to electromigration and a reduction in device reliability. More recently, in related patent application Ser. No. 16/546,387, we described a STRAMR configuration where Ia is applied from the MP across a first SP layer to the FCL, and a second current (Ib) is applied from the TS across a second SP layer to the FCL. The combined spin torque generated by both SP layers substantially reduces the current density necessary to flip the FCL magnetization and thereby improves reliability. We also disclosed an improved STRAMR configuration in related patent application Ser. No. 16/781,631 where two FCLs are flipped with a single current across the device to effectively reduce Ia current density required for assisting the MP write field compared with STRAMR devices of the prior art having only a single FCL in the WG.

In the present disclosure, we disclose another improvement in a PMR writer with a STRAMR device in the write gap. In particular, the cross-track width of the STRAMR device is substantially enlarged to enhance heat conduction and therefore to reduce the maximum temperature on the element at a given Ia current density, and to allow the number of process steps to be reduced since the width of the STRAMR device and the trailing shield (TS) width are defined during the same sequence of steps rather than with a separate process sequence for each as in the prior art. Other features are described that enable only a center portion of the FCL near the MP position to be flipped. Here, bias voltage (Vb) may be adjusted to control how large a volume of FCL is flipped, which in turn enables the tuning of erase width by an alternating current field (EWAC) and on-track assist.

Figure 5A:
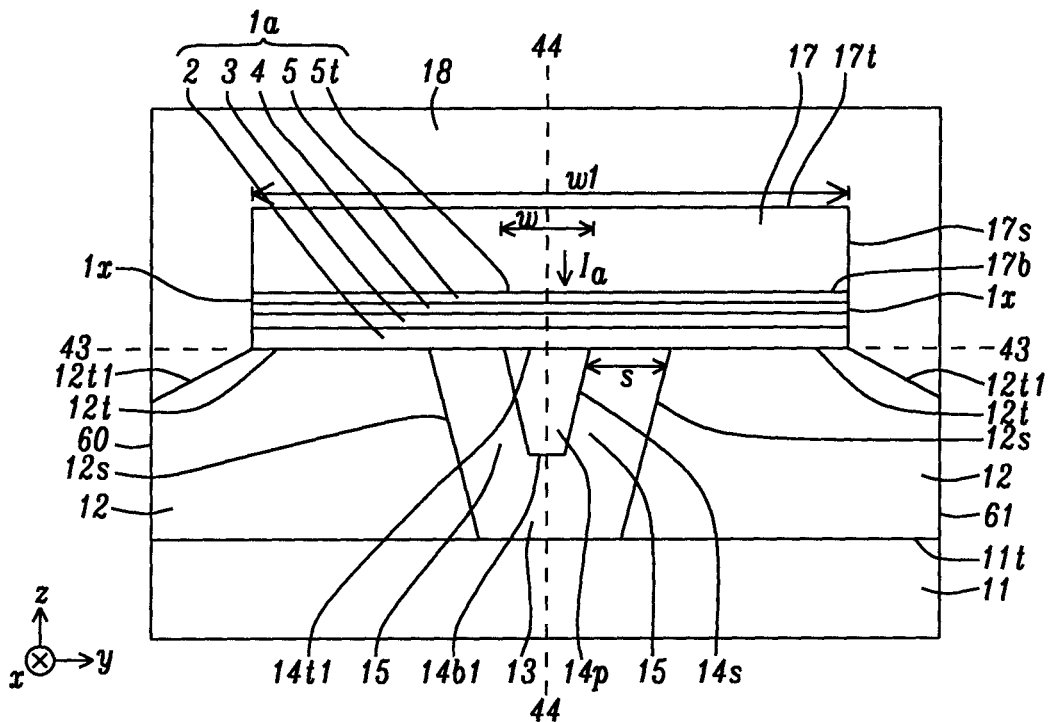
FIG. 5A is an ABS view and FIG. 5B is a down-track cross-sectional view of a STRAMR device between a TS bottom surface and MP trailing side according to a first embodiment of the present disclosure.

Referring to FIG. 5A, a first embodiment of the present disclosure is depicted. In the exemplary embodiment, the main pole has a MP tip 14p that is surrounded with an all wrap around (AWA) shield structure. MP trailing side 14t1 at the ABS is at plane 43-43 that also comprises side shield (SS) top surface outer portion 12t1 proximate to SS sides 60 and 61 on opposite sides of center plane 44-44 that bisects the MP trailing side and MP leading side 14b1. Each SS 12 has a top surface inner portion 12t at plane 43-43 and below STRAMR device 1a. In the exemplary embodiment, the SS top surface outer portions are sloped with increasing downtrack distance from plane 43-43 as the side track width from STRAMR device side 1x increases. However, in other embodiments (not shown), the SS top surface outer portions may be at plane 43-43. Leading shield 11 has a top surface 11t that contacts a bottom surface of each SS, and is separated from the MP leading side by leading gap 13. Each MP tip side 14s is separated from a side shield by side gap 15. Write shield 18 contacts SS top surface 12t1 on each side of the center plane, and also adjoins STRAMR device sides 1s, and the TS top surface 17t and sides 17s of TS 17. The TS is comprised of magnetic material such as FeNi, FeCo, FeCoNi, or FeCoN having a saturation magnetization (Ms) value from 19 kilo Gauss (kG) to 24 kG and is formed on the WG.

Figure 5B:
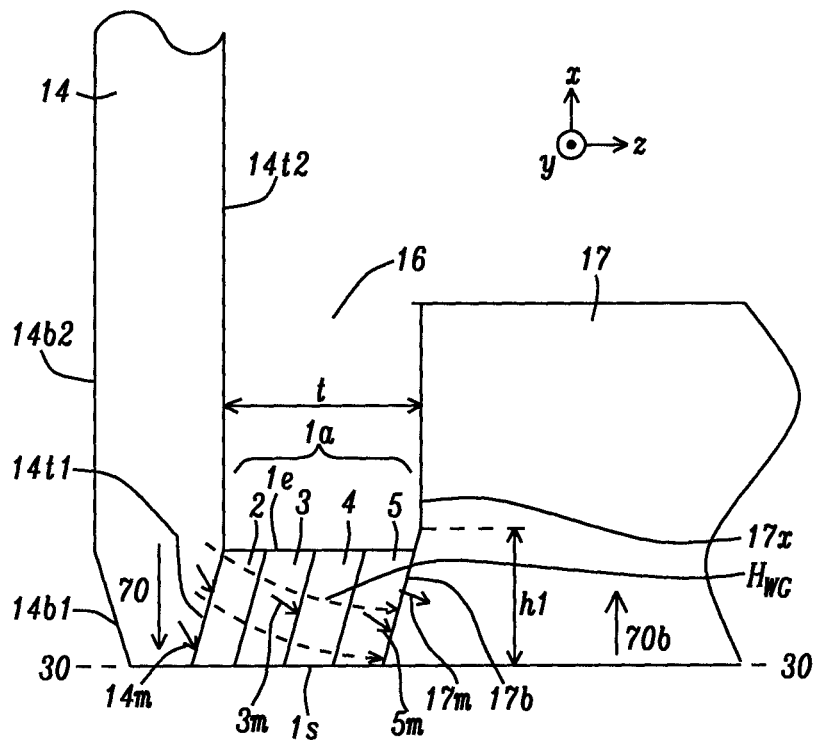
Figure 5C:
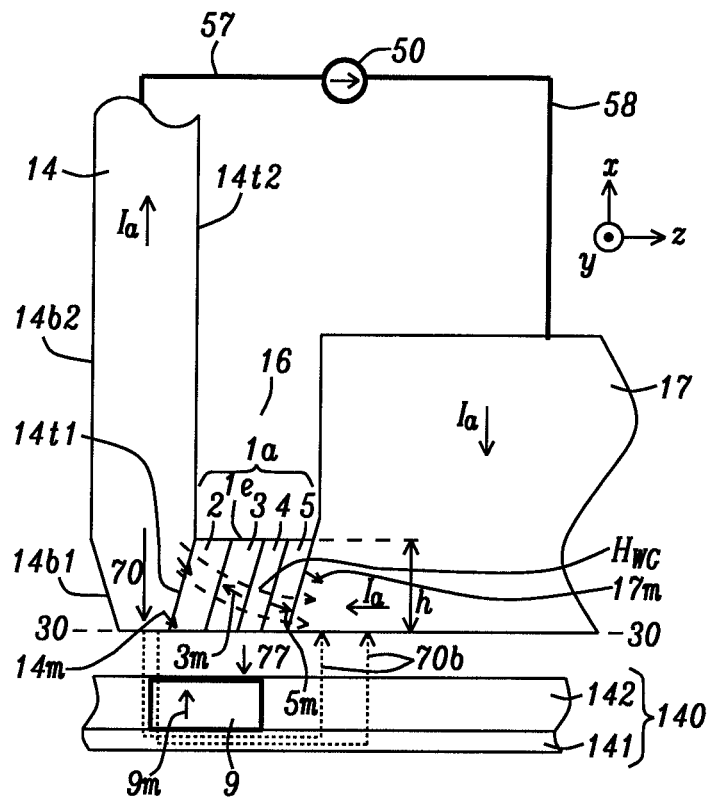
FIG. 5C is another view of the STRAMR device in FIG. 5B where Ia is applied from the TS to the MP when the write field is applied (out of the ABS) onto a magnetic medium, and where a RF field may simultaneously be generated with a STRAMR assist that causes FCL magnetization to flip and boost the write field.

A key feature is that STRAMR device 1a has a width w1 that is substantially greater than the sum (w+2s) where w is the track width of MP trailing side 14t1 and s is the width of each side gap 15. As a result, this device serves as the WG at the ABS. According to a first embodiment, the STRAMR device has a stack of layers where a non-spin polarization preserving layer (pxL) 2, FCL 3, spin polarization preserving layer (ppL) 4, and optional reference layer (RL) 5 with top surface 5t are sequentially formed on the MP trailing side. The RL (or the ppL when RL is omitted) contacts TS bottom surface 17b. As shown in FIGS. 5B-5C, the FCL has magnetization 3m that flips to a substantially opposite direction (opposing $H_{WG}$) when current Ia is applied from TS 17 to MP tip 14p and across the STRAMR device.

Preferably, pxL 2 is an alloy or multilayer made of one or more materials including but not limited to Cr, Ir, NiCr, Ta, W, Pt, Pd, Rh, and Ti that have a substantial spin flipping scattering rate such that net spin polarization in electrons transiting pxL is effectively lost. Here the pxL may also serve as a seed layer to promote uniform thickness in overlying STRAMR layers, and prevent rounding on the MP during fabrication as explained later. Meanwhile, ppL 4 is comprised of one or more non-magnetic materials such as Cu, Au, Ag, Ru, and Al having sufficient spin diffusion length to allow electron spin polarization in essentially an unaltered orientation for electrons traversing through the ppL. FCL 3 and RL 5 are magnetic layers made of one or more of Fe, Ni, and Co, or alloys thereof with one or more of B, Mo, Cr, Pt, Pd, and W added in as part of the alloy. Note that the FCL has a sufficiently large Mst (Ms×thickness) value to maintain a magnetic field that will have a substantial effect on reducing the WG magnetic field when the FCL magnetization is flipped. It is important that the FCL has a damping constant preferably less than 0.02 to allow FCL magnetization 3m to flip to a direction substantially opposite to $H_{WG}$ as a result of spin torque generated by the RL (or TS 17) and at high enough frequency as required for writing, respectively. The RL (when present) is preferably exchange coupled with the TS to improve stability.

In FIG. 5B, MP 14 is shown with a large local magnetic field 70 to write one or more bits in a magnetic medium (not shown). A portion of magnetic flux is collected by trailing shield 17 in the form of return field 70b and then returns to the MP through a trailing loop (shown in FIG. 4). A front side 1s of STRAMR device 1a is at the ABS, and bottommost pxL 2 is formed on the MP tapered trailing side 14t1, which connects with a MP top surface 14t2 that is aligned orthogonal to the ABS. The MP leading side 14b1 is also tapered and connects with the MP bottom surface 14b2. In other embodiments (not shown), one or both of the MP trailing and leading sides may be orthogonal to the ABS. WG field $H_{WS}$ is shown across the STRAMR device in a direction from the MP trailing side to TS bottom surface 17b. WG thickness t may be 25 nm or less in advanced PMR writers. FCL magnetization 3m and RL1 magnetization 5m are substantially in the $H_{WG}$ direction in the absence of an applied Ia. In preferred embodiments where STRAMR device thickness t is proximate to 25 nm or less in order to fit in a WG 16 of similar thickness, a thickness of each of FCL 3 and RL 5 is from 1 nm to 3 nm. Meanwhile, each of pxL 2 and ppL 4 has a thickness from 1 nm to 20 nm. In some embodiments, a pxL such as NiCr may have a thickness as large as 20 nm to reduce the loss of writing performance when the voltage bias (Vb) is off. In other words, a thicker pxL means the non-magnetic content in the STRAMR device will be increased to reduce the magnetic shunt in the gap, which will maintain a larger write field on the magnetic medium. TS throat height h1 is where TS bottom surface 17b connects with TS side 17x.

Referring to FIG. 5C, MP 14 produces a local magnetic (write) field 70 pointing down out of the ABS 30-30 to define the boundary of a media bit 9 with magnetization 9m pointing up on medium 140. Magnetic flux 70 in the MP proceeds through the ABS and into the recording layer 142 and soft underlayer (SUL) 141. The microwave assisted magnetic recording (MAMR) aspect that generates RF field 77 on magnetic bit 9 occurs when FCL magnetization 3m enters a precessional state 3p (FIG. 7) with cone angle α<180° at a first current density for Ia. When Ia is below a critical value, magnetization 3m remains substantially in the $H_{WG}$ direction and there is no STRAMR effect. However, when Ia exceeds a critical value between $1 \times 10^6$ Amps/cm$^2$ to $1 \times 10^8$ Amps/cm$^2$, magnetization 3m flips to a precessional state 3p' having cone angle β that is substantially opposed to the $H_{WG}$ direction thereby increasing reluctance in WG 16 and enhancing the write field. As Ia current density increases further, angle β decreases until approaching 0 degrees where there is a maximum STRAMR effect but essentially no MAMR effect. The height h of STRAMR device backside 1e may be less than TS throat height h1.

Note that DC current Ia from source 50 in FIG. 5C is applied through lead 58 to TS 17 and then flows across STRAMR device Ia to MP 14 before returning through lead 57 to the dc source. It should be understood that the flow of electrons is from the MP 14 to TS 17 when the Ia direction is from the TS to MP. The electrons with a net spin polarization from FCL are partially reflected from the RL, produce a spin torque on FCL 3 that causes FCL magnetization 3m to rotate and eventually flip if the current is sufficiently large.

The mechanism of FCL magnetization 3m flipping is based on the behavior of an unbalanced electron population with spins pointing parallel and anti-parallel to the field. A similar situation exists in RL (and in TS 17). The portion of electrons in Ia having a moment that is parallel to the majority spin direction in the RL are able to enter RL with smaller resistance. However, electrons with a spin moment that is anti-parallel to the majority spin direction in the RL do not enter the RL easily because of less unoccupied states in the RL that are available for them, and are scattered back to FCL 3. The back scattered electrons (not shown) exert spin torque on magnetization 3m that results in flipping for a STRAMR effect when the Ia current density is sufficiently high, or excite the FCL magnetization into a precessional state 3p for a MAMR assist when Ia current density does not exceed the critical value mentioned previously.

Figure 6A:
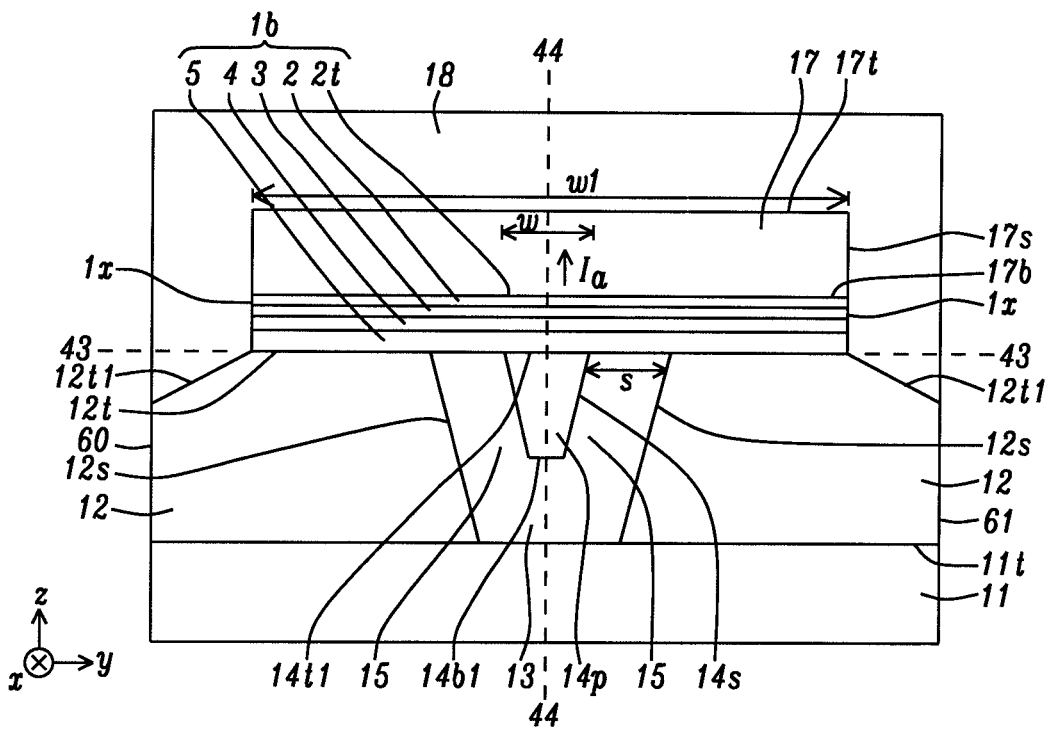
FIG. 6A is an ABS view and FIG. 6B is a down-track cross-sectional view of a STRAMR device between a TS bottom surface and MP trailing side according to a second embodiment of the present disclosure.

According to a second embodiment shown in FIG. 6A, the STRAMR device layers in FIG. 5A are retained except the positions of the layers are reversed so that the optional RL 5, and then ppL 4, FCL 3, and pxL 2 with top surface 2t in STRAMR device 1b are sequentially formed on the MP tapered trailing side 14t1. In this embodiment, current Ia is applied from the MP tip 14p to TS 17 (electrons flow from the TS to MP) in order to cause FCL magnetization flipping within the STRAMR device that increases reluctance in WG and enhances the write field.

Figure 6B:
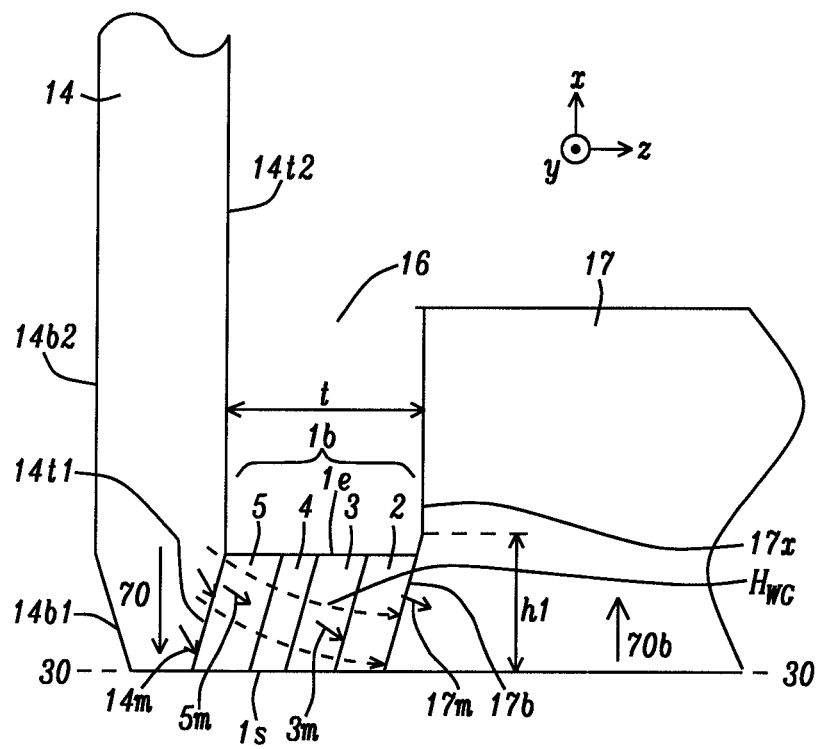

Referring to FIG. 6B, when the MP moment (field) 70 is pointing down out of the ABS 30-30 to write the boundary of bit 9m pointing up in a magnetic bit 9 in the recording layer 140 (FIG. 6C), return field 70b is pointing up and into TS 17. Again, there is local magnetization 14m within MP 14 and proximate to MP trailing side 14t1, and there is local magnetization 17m proximate to TS bottom surface that are both aligned substantially parallel to $H_{WG}$ that is in a direction from the MP to TS. In the absence of an applied current, FCL magnetization 3m and RL magnetization 5m are also substantially parallel to $H_{WG}$. In the exemplary embodiment, front side 1s of the STRAMR device 1b is at the ABS. However, in other embodiments, the front side may be recessed from the ABS to reduce the risk of wear during repeated touchdowns and flying with low spacing to the disks.

Figure 6C:
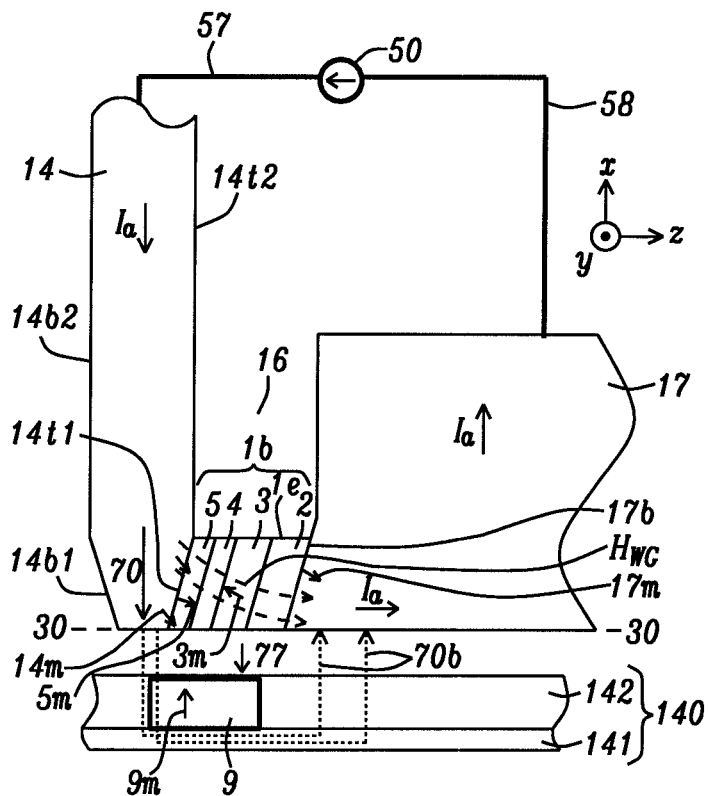
FIG. 6C is another view of the STRAMR device in FIG. 6B where Ia is applied from the MP to the TS when the write field is applied (out of the ABS) onto a magnetic medium, and where a RF field may simultaneously be generated with a STRAMR assist that causes FCL magnetization to flip and boost the write field.
Figure 7:
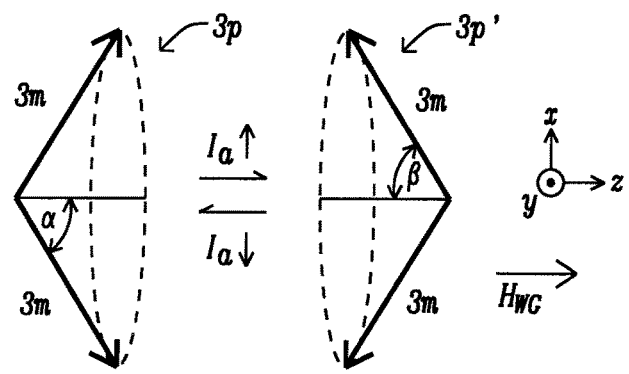
FIG. 7 illustrates a cone angle $\alpha$ of FCL magnetization in a precessional state that flips to a precessional state with cone angle $\theta$ when an Ia of sufficient current density is applied across the STRAMR device according to an embodiment of the present disclosure.

In FIG. 6C, current Ia is applied from MP 14 and across STRAMR device 1b to TS 17 to generate one or both of a MAMR effect (RF field 77), and a STRAMR effect where FCL magnetization 3m is driven into precessional state 3p (MAMR assist) or 3p' (MAMR and/or STRAMR assist) as shown in FIG. 7. As mentioned earlier in the first embodiment, when Ia current density is below a critical value, FCL magnetization is in a dynamic (precessional) state 3p with cone angle α<180°. However, when Ia current density exceeds a critical value between $1 \times 10^6$ Amps/cm$^2$ to $1 \times 10^8$ Amps/cm$^2$, FCL magnetization flips to precessional state 3p' having cone angle β that is substantially opposed to the $H_{WG}$ direction thereby increasing reluctance in WG 16 and enhancing write field 70. Cone angle β decreases with increasing Ia current density until approaching 0 degrees where there is a maximum STRAMR effect. An advantage of all embodiments described herein is that the substantially larger width w1 for the STRAMR device is responsible for better heat transfer away from the STRAMR layers and better reliability as a result of a lower temperature and less risk for breakdown mechanisms including electromigration. Moreover, as described later, TS sides 17s and STRAMR device side 1x on each side of center plane 44-44 in FIG. 5A and FIG. 6A are defined during the same process sequence rather than separately in prior art where is STRAMR width is less than or equal to the track width w of the MP trailing side 14t1.

In the second embodiment, FCL magnetization 3m is flipped according to the same mechanism as in the first embodiment, only the position of the reference layer is changed and also current direction is reversed.

In the embodiments illustrated in FIG. 5A and FIG. 6A, a center portion of the STRAMR device is defined as the region within layers 2-5 that is <½w from center plane 44-44 while STRAMR device outer portions are regions within the STRAMR stack of layers 2-5 that are >½w from the center plane. In some embodiments, the side gaps (SG) are typically made of insulating materials in order to minimize conduction of electrons from the SS 12 to the MP tip 14p and thereby maximize conduction between TS 17 and MP trailing side 14t1. Accordingly, FCL magnetization in the center portion of FCL 3 will flip first as bias voltage (not shown) is increased because the local current density is higher than the surrounding area. As Vb and Ia current density is further increased, FCL magnetization in the outer portions of the FCL will also be flipped but in an order where the flipping occurs in regions of FCL 3 that are above SG 15 before flipping occurs in regions above SS 12. Thus, controlling the Vb is a means of balancing the extent of STRAMR assist to the write field and possible increase in the erase width. In other words, EWAC may be maintained at acceptable values while still realizing a substantial boost in the write field.

Figure 8A:
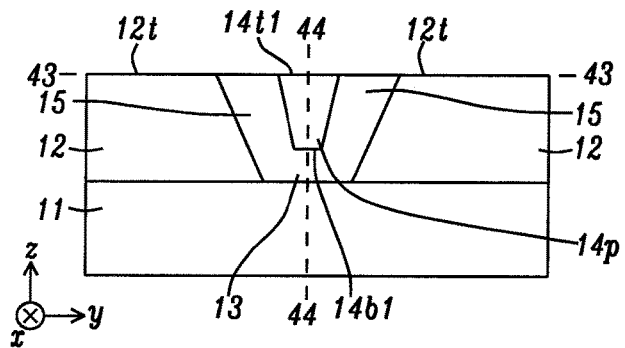
FIG. 8A and FIG. 8B show an ABS view and down-track cross-sectional view, respectively, of a first step in the process of forming a STRAMR device of the present disclosure where a tapered trailing side is formed on the main pole.
Figure 8B:
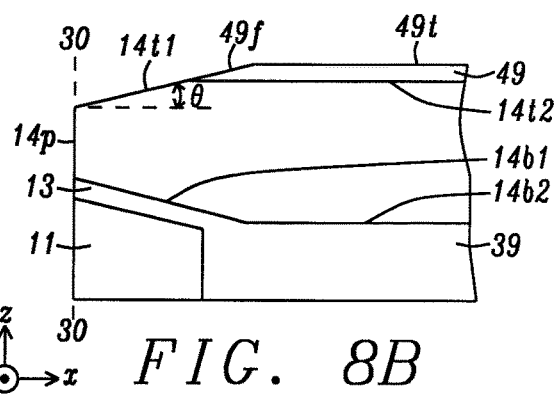

The present disclosure also encompasses a process sequence for fabricating a STRAMR device according to an embodiment described herein and is provided in FIG. 8A through FIG. 15. The partially formed writer structure including MP tip 14p that adjoins side gaps 15 and leading gap 13 in FIG. 8A is provided according to a conventional process sequence and is not described herein. Side shield top surfaces 12t are coplanar with a trailing edge of the MP tapered trailing side 14t1 at plane 43-43, which is orthogonal to the subsequently formed ABS plane. FIG. 8B shows the down-track cross-sectional view at center plane 44-44 in FIG. 8A. MP tapered trailing side 14t1 has a taper angle θ and is coplanar with a tapered front side 49f of dielectric layer 49 made of $Al_2O_3$ or $SiO_2$ that is formed on MP top surface 14t2. Note that the eventual ABS, hereafter referred to as ABS plane 30-30, is not determined until a lapping process is performed after the slider is formed in the backend process.

Figure 9:
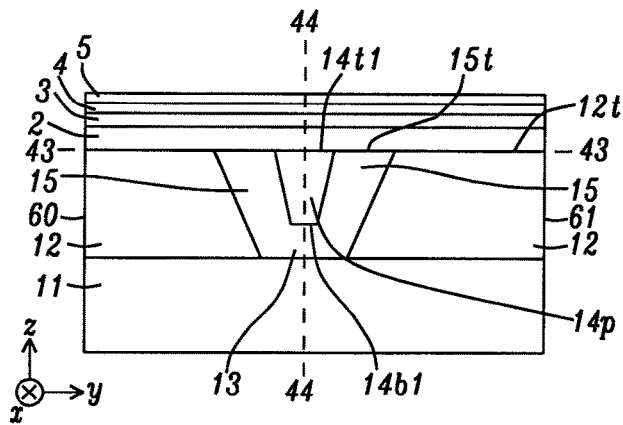
FIG. 9 shows an ABS view of the writer structure in FIG. 8A after a STRAMR stack of layers is deposited on the side shields, side gaps, and MP trailing side.

In FIG. 9, a STRAMR stack of layers 2-5 described previously with regard to the first embodiment is deposited on the MP tapered trailing side 14t1, SS top surfaces 12t, and SG top surface 15t, and on dielectric layer 49 above the MP top surface (not shown), and has a full width that is defined as the width between sides 60, 61 of the SS 12. Alternatively, the STRAMR stack of layers has RL 5 on the MP trailing side and pxL 2 as the uppermost layer as in the second embodiment. The STRAMR stack of layers is preferably conformal to the underlying topography and has a uniform thickness. In other embodiments, the STRAMR stack has a pxL/FCL/ppL or ppL/FCL/pxL configuration described previously.

Figure 10:
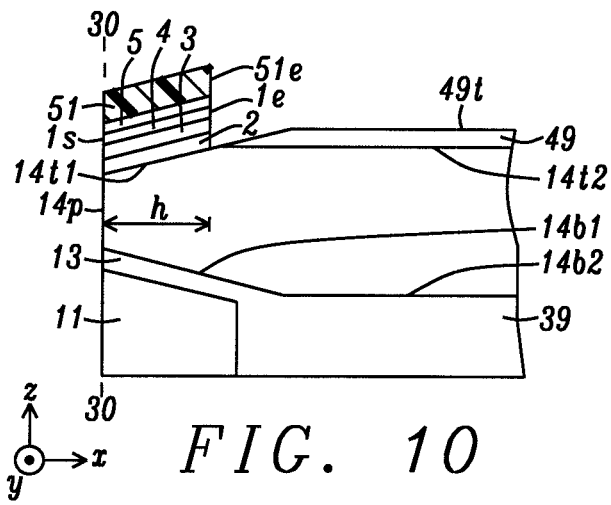
FIG. 10 is a down-track cross-sectional view of the writer structure in FIG. 9 after a photoresist mask is formed on the STRAMR stack of layers, and unprotected regions of the STRAMR stack of layers are removed to form a STRAMR backside.

Referring to FIG. 10, a first photoresist layer is coated on the STRAMR stack of layers, and is patternwise exposed and developed to provide a photoresist mask 51 having a backside 51e at height h from plane 30-30. The photoresist mask pattern is etch transferred through unprotected portions of the STRAMR stack of layers using a RIE and or IBE process, for example, thereby forming STRAMR backside 1e below photoresist mask backside 51e, and stopping on top surface 49t of dielectric layer 49.

Figure 11:
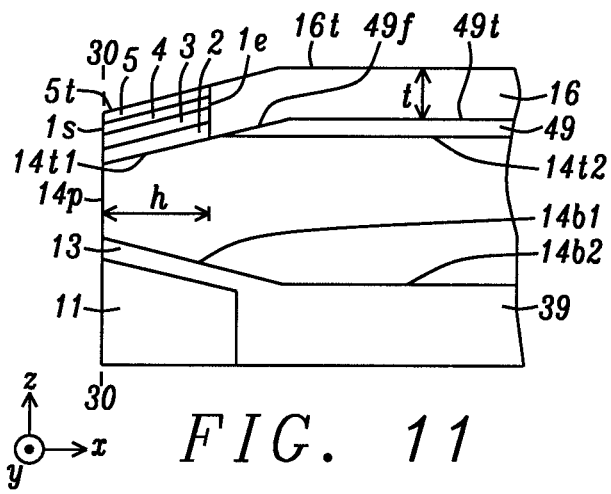
FIG. 11 is a down-track cross-sectional view of the writer structure in FIG. 10 after a WG layer is deposited behind the STRAMR backside and the photoresist mask is removed according to an embodiment of the present disclosure.

In FIG. 11, the partially formed writer structure is shown after an insulating layer 16 having thickness t is deposited on dielectric layer 49 and the photoresist mask is removed.

Figure 12:
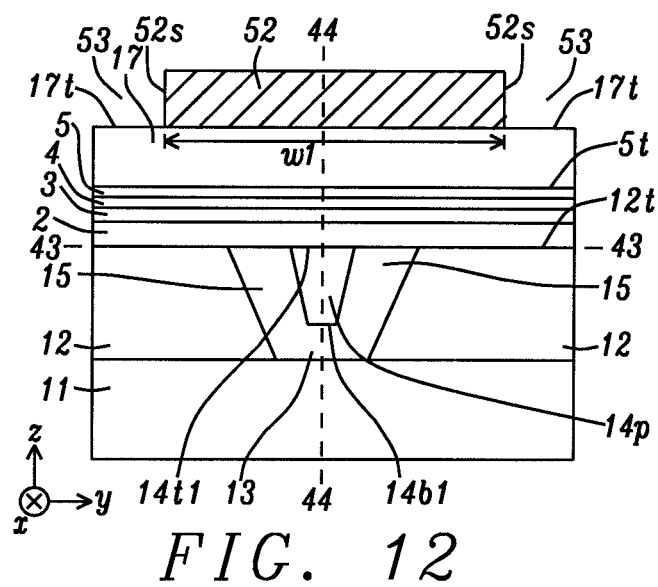
FIG. 12 is an ABS view of the writer in FIG. 11 after a TS layer is deposited on the STRAMR stack of layers and the WG layer, and then a second photoresist mask is formed on the TS layer to uncover side portions of the TS layer.

Referring to FIG. 12, TS 17 is plated on RL 5 (or on ppL 4 when the RL is absent), and then a second photoresist layer is coated on the TS and is patternwise exposed and developed with a photolithography method to yield photoresist mask 52 with sides 52s on each side of center plane 44-44. Openings 53 adjacent to each side 52s expose a portion of TS top surface 17t. The photoresist mask has width w1 that will be used to define the same width in the TS and STRAMR stack of layers 2-5 in a subsequent step.

Figure 13:
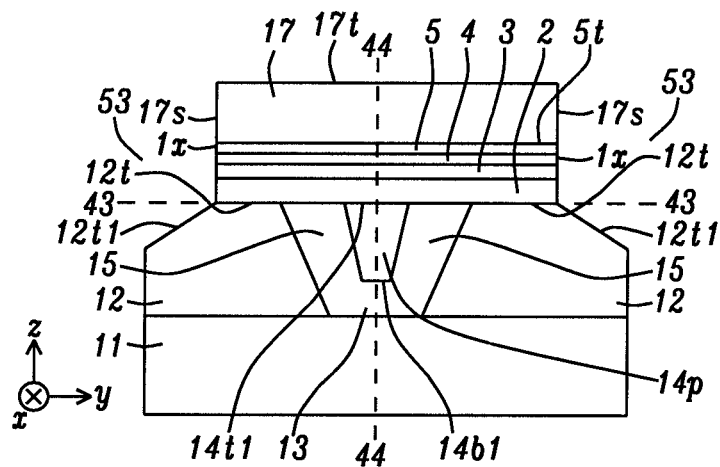
FIG. 13 is an ABS view of the writer in FIG. 12 after an IBE process is performed to transfer openings above the TS side portions through the TS layer and STRAMR stack of layers, and stopping in the side shields (SS).

Referring to FIG. 13, an IBE process is performed to extend opening 53 downward and remove exposed portions of TS 17, STRAMR stack of layers 2-5 thereby forming TS sides 17s and STRAMR sides 1x. In the exemplary embodiment, the IBE also removes a portion of each SS 12 to form sloped SS top surface 12t1 that connects with SS top surface 12t at a cross-track width ½ w1 on each side of center plane 44-44. Thereafter, the second photoresist mask is removed by a well-known method. An important advantage of the process flow of the present disclosure is that TS width and STRAMR width are formed during the same sequence of process steps thereby simplifying the fabrication process compared with STRAMR devices of the prior art where TS width and STRAMR width definition involve different photoresist masks and different etch processes.

Another advantage of the process flow of the present disclosure is that STRAMR top surface 5t (or 2t in other embodiments) and TS top surface 17t are essentially planar from the center plane 44-44 to STRAMR device sides 1x and TS sides 17s. On the other hand, in the prior art where a STO (STRAMR) device width is restricted to the MP trailing side track width and a WG adjoins each side of the STO device, it is difficult to achieve a WG top surface that is coplanar with the STRAMR device top surface. As a result, the TS may have a non-uniform thickness (non-planar bottom surface) that leads to variations in device performance.

Figure 14:
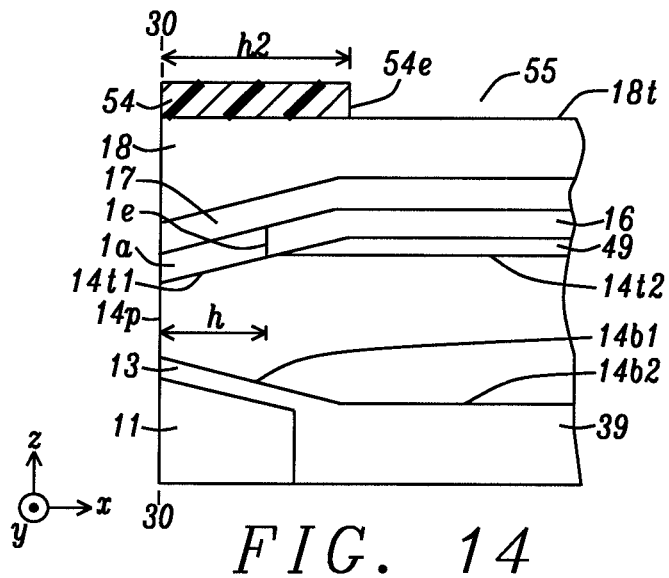
FIGS. 14-15 are down-track cross-sectional views after the second photoresist mask is removed and a write shield (WS) is deposited on the TS layer and SS, and a patterning and etching process sequence is performed to establish a backside on each of the TS layer and the WS according to an embodiment described herein.

In FIG. 14, the partially formed PMR writer is depicted after write shield (WS) 18 is deposited on TS 17 and on exposed portions of the side shields (not shown). A third photoresist layer is coated on the WS, patternwise exposed, and developed with a photolithography process to yield photoresist mask 54 having a backside 54e at height h2 from plane 30-30 where h2 is preferably larger than height h of STRAMR backside 1e. Opening 55 behind photoresist backside 54e exposes a portion of WS top surface 18t.

Figure 15:
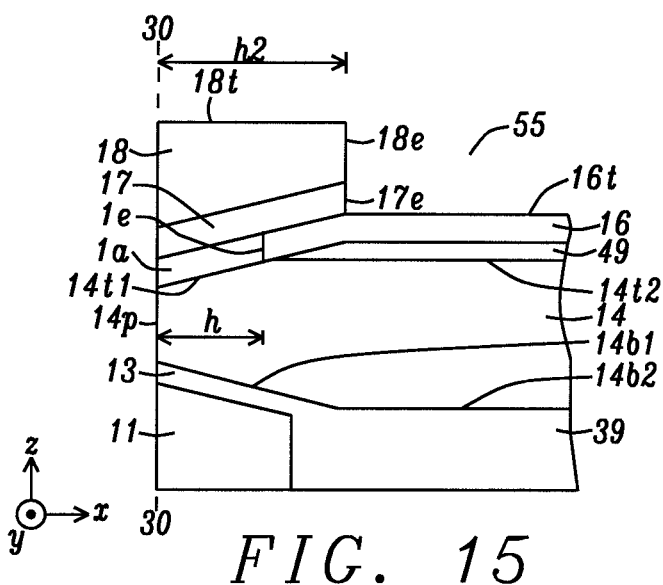

FIG. 15 depicts the partially formed writer structure in FIG. 14 after a third RIE or IBE step is performed to extend opening 55 downward through exposed regions of TS 17 and WS 18, and stopping at WG top surface 16t thereby forming TS backside 17e and WS backside 18e at height h2 from plane 30-30. The third photoresist mask is removed. Thereafter, a conventional process flow including a backend lapping process is followed to form the ABS at plane 30-30 and complete the PMR writer structure. According to one embodiment, a combined read-write head 1 shown in FIG. 4 is formed at the completion of the fabrication process.

Since the STRAMR device disclosed herein has a substantially larger cross-track width than STRAMR devices in the prior art, a larger Ia current density may be needed to generate sufficient spin torque on the center portion of the FCL for FCL magnetization flipping. However, the maximum current density in the FCL may be limited to a center FCL portion above the MP trailing side to allow an increase in lifetime (LT) for a given amount of ADC improvement. Furthermore, better thermal conduction from the outer portions of the STRAMR device to surrounding shield layers may lower the operating temperature of the STRAMR device to enable a better tradeoff of ADC gain vs. device LT. In other words, good thermal contact between the STRAMR device and WS and SS will reduce temperature rise within the FCL for a given volume that is flipped. It is anticipated that the number of process steps required to fabricate the portion of the PMR writer comprised of the STRAMR device and TS layer is lowered by 50% thereby providing a large increase in productivity.

While the present disclosure has been particularly shown and described with reference to, the preferred embodiments thereof, it will be understood by those skilled in the art that various changes in form and details may be made without departing from the spirit and scope of this disclosure.

I claim:

1. A spin transfer torque reversal assisted magnetic recording (STRAMR) structure, comprising:
    (a) a main pole (MP) that is configured to generate a write gap (WG) magnetic field in a down-track direction between a MP trailing side and a trailing shield, and across a STRAMR device, and wherein a side gap (SG) is formed between each side of the MP and a side shield;
    (b) the trailing shield (TS); and
    (c) the STRAMR device having a width that is substantially greater than a sum (w+2s) where w is a track width of the MP trailing side at an air bearing surface (ABS) and s is a width of each SG at the ABS, and where the STRAMR device is formed between the MP and TS, comprising:
    (1) a non-spin polarization preserving layer (pxL) on the MP trailing side;
    (2) a flux change layer (FCL) with a first magnetization substantially parallel to the WG magnetic field and having a bottom surface contacting the pxL; and
    (3) a spin polarization preserving layer (ppL) that adjoins a FCL top surface, and wherein the STRAMR device is configured so that when a direct current (Ia) of sufficient magnitude is applied from the TS to the MP across the STRAMR device, the first magnetization flips to a direction substantially opposing the WG magnetic field thereby enhancing a write field in a recording medium.

2. The STRAMR structure of claim 1 wherein a top surface of the ppL contacts the TS bottom surface, and a portion of the TS that is proximate to the TS bottom surface is a magnetic layer that back scatters spin polarized electrons in the Ia to the FCL and wherein the back scattered spin polarized electrons generate a spin torque on the FCL that causes the first magnetization to flip.

3. The STRAMR structure of claim 1 wherein the STRAMR device is further comprised of a reference layer (RL) adjoining a top surface of the ppL, and contacting the TS bottom surface, and wherein the RL is a magnetic layer that back scatters spin polarizes electrons in the Ia to the FCL and wherein the back scattered spin polarized electrons generate a spin torque on the FCL that causes the first magnetization to flip.

4. The STRAMR structure of claim 3 wherein each of the FCL and RL is comprised of one or more of Fe, Ni, and Co, or alloys thereof with one or more of B, Mo, Cr, Pt, Pd, and W.

5. The STRAMR structure of claim 4 wherein the FCL has a saturation magnetization×thickness (Mst) value that is sufficiently large to maintain a magnetic field that will have a substantial effect on reducing the WG magnetic field when the first magnetization is flipped.

6. The STRAMR structure of claim 4 wherein the RL is exchange coupled to the TS.

7. The STRAMR structure of claim 1 wherein the ppL is one or more of Cu, Au, Ag, Ru, and Al.

8. The STRAMR structure of claim 1 wherein the pxL is an alloy or multilayer that is one or more of Cr, Ir, NiCr, Ta, W, Pt, Pd, Rh, and Ti.

9. The STRAMR structure of claim 1 wherein a width of the TS is essentially equivalent to the STRAMR device width at the ABS.

10. A head gimbal assembly (HGA), comprising:
    (a) the STRAMR structure of claim 1; and
    (b) a suspension that elastically supports a slider with the STRAMR structure, wherein the suspension has a flexure to which the slider is joined, a load beam with one end connected to the flexure, and a base plate connected to the other end of the load beam.

11. A magnetic recording apparatus, comprising:
    (a) the HGA of claim 10;
    (b) a magnetic recording medium positioned opposite the slider;
    (c) a spindle motor that rotates and drives the magnetic recording medium; and
    (d) a device that supports the slider, and that positions the slider relative to the magnetic recording medium.

12. A spin transfer torque reversal assisted magnetic recording (STRAMR) structure, comprising:
    (a) a main pole (MP) that is configured to generate a write gap (WG) magnetic field in a down-track direction between a MP trailing side and a trailing shield, and across a STRAMR device, and wherein a side gap (SG) is formed between each side of the MP and a side shield;
    (b) the trailing shield (TS); and
    (c) the STRAMR device having a width that is substantially greater than a sum (w+2s) where w is a track width of the MP trailing side at an air bearing surface (ABS) and s is a width of each SG at the ABS, and where the STRAMR device is formed between the MP and TS, comprising:
    (1) a non-spin polarization preserving layer (pxL) that contacts a TS bottom surface;
    (2) a flux change layer (FCL) with a first magnetization substantially parallel to the WG magnetic field and having a top surface that contacts the pxL; and
    (3) a spin polarization preserving layer (ppL) that adjoins a FCL bottom surface, and wherein the STRAMR device is configured so that when a direct current (DC) than is an (Ia) of sufficient magnitude is applied from the MP to TS across the STRAMR device, the first magnetization flips to a direction substantially opposing the WG magnetic field thereby increasing reluctance in the WG and enhancing a write field in a recording medium.

13. The STRAMR structure of claim 12 wherein a ppL bottom surface contacts the MP trailing side, and a portion of the MP that is proximate to the MP trailing side is a magnetic layer that back scatters spin polarized electrons in the Ia to the FCL and wherein the back scattered spin polarized electrons generate a spin torque on the FCL that causes the first magnetization to flip.

14. The STRAMR structure of claim 12 wherein the STRAMR device is further comprised of a reference layer (RL) formed on the MP trailing side and adjoining a ppL bottom surface, and wherein the RL is a magnetic layer that back scatters spin polarized electrons in the Ia to the FCL and wherein the back scattered spin polarized electrons generate a spin torque on the FCL that causes the first magnetization to flip.

15. The STRAMR structure of claim 14 wherein each of the FCL and RL is comprised of one or more of Fe, Ni, and Co, or alloys thereof with one or more of B, Mo, Cr, Pt, Pd, and W.

16. The STRAMR structure of claim 15 wherein the FCL has a saturation magnetization×thickness (Mst) value that is sufficiently large to maintain a magnetic field that will have a substantial effect on reducing the WG magnetic field when the first magnetization is flipped.

17. The STRAMR structure of claim 15 wherein the RL is exchanged coupled to the TS.

18. The STRAMR structure of claim 12 wherein the ppL is made of one or more of Cu, Au, Ag, Ru, and Al.

19. The STRAMR structure of claim 12 wherein the pxL is an alloy or multilayer that is one or more of Cr, Ir, NiCr, Ta, W, Pt, Pd, Rh, and Ti.

20. The STRAMR structure of claim 12 wherein a width of the TS is essentially equivalent to the STRAMR width at the ABS.

21. A head gimbal assembly (HGA), comprising:
(a) the STRAMR structure of claim 12; and
(b) a suspension that elastically supports a slider with the STRAMR structure, wherein the suspension has a flexure to which the slider is joined, a load beam with one end connected to the flexure, and a base plate connected to the other end of the load beam.

22. A magnetic recording apparatus, comprising:
(a) the HGA of claim 21;
(b) a magnetic recording medium positioned opposite to the slider;
(c) a spindle motor that rotates and drives the magnetic recording medium; and
(d) a device that supports the slider, and that positions the slider relative to the magnetic recording medium.

23. A method of forming a perpendicular magnetic recording (PMR) writer having a spin transfer torque reversal assisted magnetic recording (STRAMR) structure, comprising:
(a) providing a main pole (MP) with a tapered trailing side that extends from a first plane to a MP top surface that is aligned orthogonal to the first plane and has a first dielectric layer formed thereon, and wherein a side gap separates the MP from a side shield on each side of a center plane that bisects the MP tapered trailing side;
(b) depositing a STRAMR stack of layers on a top surface of the MP tapered trailing side, first dielectric layer, side gaps, and side shields; the STRAMR stack of layers is bisected by the center plane and comprises:
(1) a non-spin polarization preserving layer (pxL);
(2) a flux change layer (FCL) with a first magnetization that flips to a direction substantially opposing a write gap (WG) field when sufficient spin torque is applied from a reference layer (RL);
(3) a spin polarization preserving layer (ppL); and
(4) the RL with a second magnetization that is aligned substantially along a direction of a WG field, and wherein spin polarized electrons are back scattered from the RL to generate a spin torque on the FCL when a direct current (DC) is applied across the STRAMR stack of layers that has a pxL/FCL/ppL/RL configuration or a RL/ppL/FCL/pxL configuration in a direction from the RL to the pxL and electrons in the DC transit from the pxL to RL;
(c) forming a backside on the STRAMR stack of layers that is a first height (h) from the first plane, and depositing an insulating layer that adjoins the backside of the STRAMR stack of layers;
(d) depositing a trailing shield (TS) layer on the STRAMR stack of layers; and
(e) patterning the TS layer and STRAMR stack of layers to form sides thereon and thereby forming a STRAMR device having a first width (w1) that is bisected by the center plane and is essentially equal to a width of the patterned TS layer.

24. The method of claim 23 further comprising a deposition of a write shield (WS) on the patterned TS layer and on exposed portions of the side shields.

25. The method of claim 23 wherein the STRAMR stack of layers has the pxL/FCL/ppL/RL configuration so that the RL contacts a bottom surface of the TS layer, the pxL adjoins the MP tapered trailing side, and the PMR writer is configured to apply the DC from the TS layer to the MP.

26. The method of claim 23 wherein the STRAMR stack of layers has the RL/ppL/FCL/pxL configuration so that the pxL contacts a bottom surface of the TS layer, the RL is on the MP tapered trailing side, and the PMR writer is configured to apply the DC from the MP to the TS layer.

27. The method of claim 23 wherein the ppL is one or more of Cu, Au, Ag, Ru, and Al.

28. The method of claim 23 wherein the pxL is an alloy or multilayer that is one or more of Cr, Ir, NiCr, Ta, W, Pt, Pd, Rh, and Ti.

29. The method of claim 23 wherein each of the FCL and RL is comprised of one or more of Fe, Ni, and Co, or alloys thereof with one or more of B, Mo, Cr, Pt, Pd, and W.

* * * * *